2,764,274

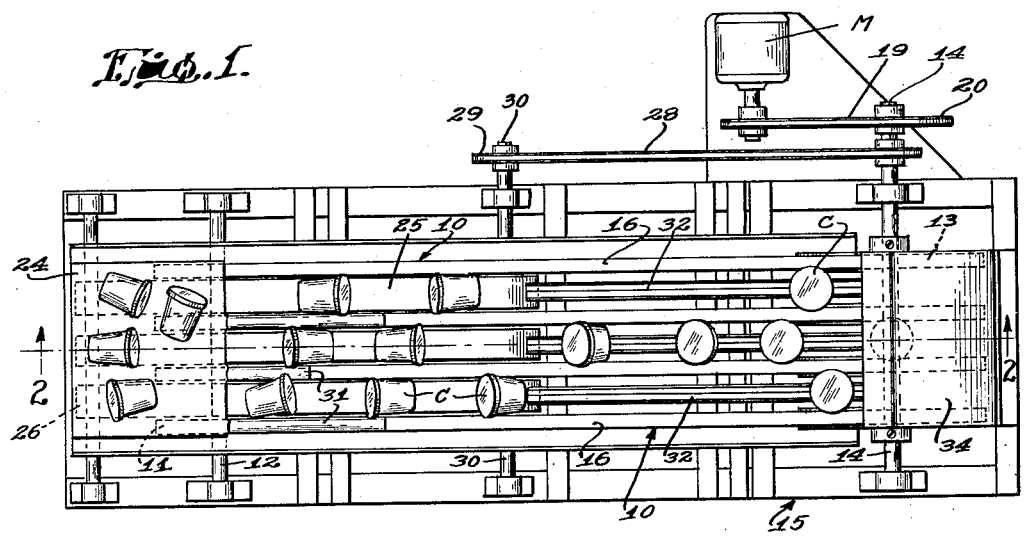
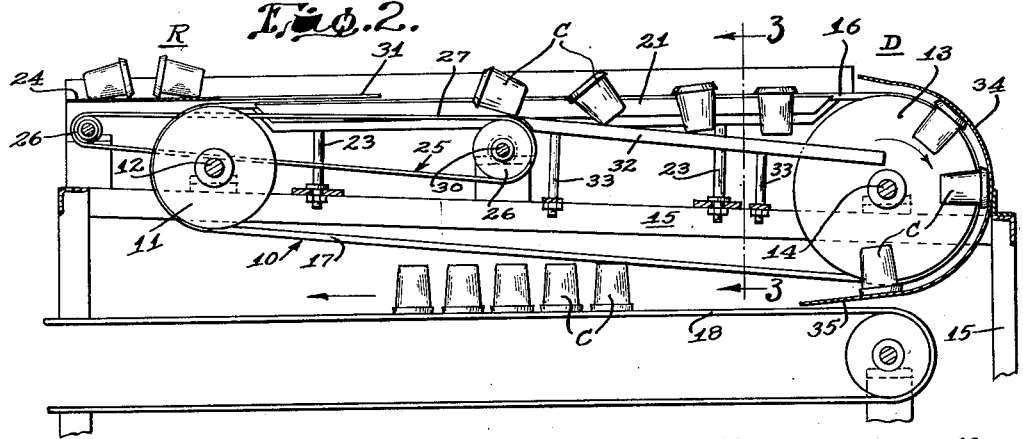
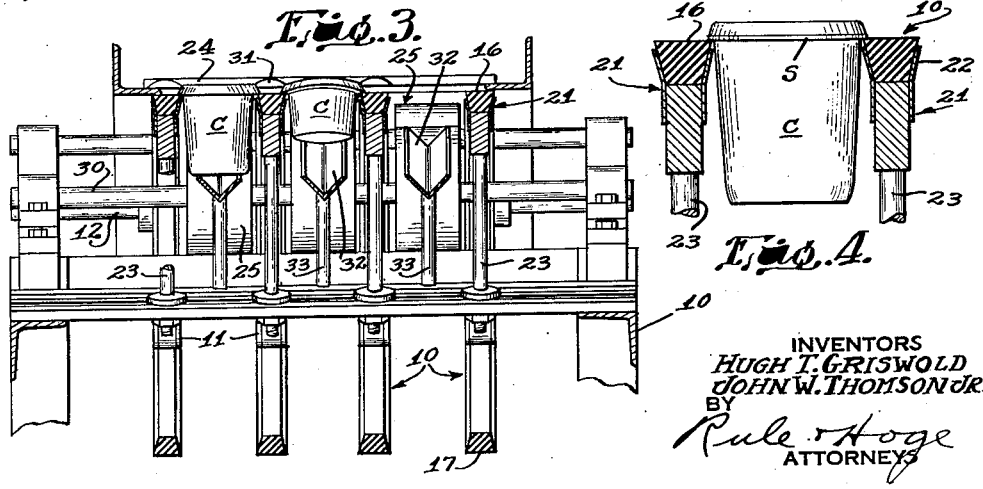
INVENTORS
HUGH T. GRISWOLD
JOHN W. THOMSON JR.
BY
Rule & Hoge
ATTORNEYS United States Patent Office 2,764,274
Patented Sept. 25, 1956

ARTICLE HANDLING APPARATUS

Hugh T. Griswold, San Francisco, and John W. Thomson, Jr., Menlo Park, Calif., assignors to Owens-Illinois Glass Company, a corporation of Ohio Application July 7, 1955, Serial No. 520,448

8 Claims. (Cl. 198—30)

The present invention is an improved article handling apparatus and more particularly is an apparatus for orienting and delivering filled and capped tumblers and the like containers capped-end down to a conveyor which transports the containers to a "casing station" where they may automatically or manually be placed in paperboard cartons or such shipping containers.

In connection with the general handling of filled sealed glass tumblers or the like containers it is routine procedure following removal from a retort chamber to place these containers at random upon an accumulator table or such support, from which they are later removed manually and deposited in proper position in the shipping cartons or like receptacles. This is a more or less tedious operation and of necessity a relatively slow one.

An object of our invention is the provision of automatic mechanical means which with a high degree of efficiency and speed will receive these sealed packages from the accumulator table and properly orient and invert them for placement upside down upon a conveyor, the latter functioning to deliver these containers to a "casing station" in such position and so grouped that cartons may be placed thereover in the usual manner.

Another object of our invention is the provision in apparatus of the above character of novel means for orienting the containers just prior to their delivery to carrier belts which function to invert the containers and deposit them upside down upon the conveyor which transports them to the "casing station."

Other objects will be in part apparent and in part pointed out hereinafter.

In the drawings:

Fig. 1 is a plan view of the apparatus comprising the present invention.

Fig. 2 is a longitudinal sectional elevational view taken substantially along the line 2—2 of Fig. 1.

Fig. 3 is a transverse sectional view with parts in elevation, taken along the line 3—3 of Fig. 2.

Fig. 4 is a fragmentary detail sectional view illustrating the manner in which the carrier belts supportingly engage the sealed containers.

This apparatus is designed for the rapid handling of filled, sealed glass tumblers, such as jelly glasses or the like containers as they emerge from a cooler, freezing tunnel, retort or other processing equipment preparatory to being placed in paperboard shipping cartons or such receptacles. These containers, especially when capped, incorporate a radial annular projection capable of supporting contact with carrier belts, as will be apparent presently. Owing to the instability of such containers, they usually being tapered toward the base, it is difficult to maintain them in an upright position at this point, in consequence of which they pile up and occupy random positions upon an accumulator or sorting table from which they ordinarily are manually removed and placed either directly in the cartons, or upon a conveyor which will carry them to the "casing station." Our invention, as stated heretofore, provides novel and simple apparatus for mechanically and automatically performing the above function at high speed.

The apparatus involved and as illustrated comprises a plurality of carrier belts 10, Fig. 2, which are arranged side by side in parallel spaced relationship and trained over two groups of pulleys, one group 11 being mounted upon a horizontal shaft 12 at the article receiving end R of the apparatus while the other group 13 is trained over a horizontal shaft 14 at the discharge end D. Preferably, though not necessarily, these shafts are mounted at different elevations on the main frame 15 and the pulleys 13 at the delivery end are of somewhat larger diameter than the pulleys 11, all with the result that the upper container supporting reaches 16 of the carrier belts are substantially, if not precisely horizontally positioned, while the lower reaches 17 move along an upwardly inclined path toward the receiving end so that they gradually clear containers C which have been placed upside down upon continuously moving article receiving means. This article receiving means as shown, comprises an endless conveyor belt 18, the article supporting reach of which moves horizontally from a position immediately beneath the discharge end of the apparatus to a "casing station" (not shown). Power is supplied to the apparatus by means of an electric motor M operating through a driving belt 19 which is trained over a pulley 20 at one end of the aforementioned shaft 14.

For the purpose of rigidly backing up the container supporting reaches 16 of the carrier belts 10, we provide supporting members 21 which extend lengthwise of said upper reaches and are formed with upwardly facing channels or grooves providing runways 22 for these portions of the carrier belts. Preferably, though not necessarily, the carrier belts and said runways 22 are of generally dovetail contour in cross-section as best shown in Fig. 4. These supporting members 21 preferably are adjustably connected to the frame 15 by means of rods 23.

At the receiving end R of the apparatus there is arranged an accumulator table 24 upon which filled, capped tumblers are deposited in random fashion as they emerge from the retort or other processing equipment. These tumblers then are manually or otherwise pushed off of the table, as a first step in placing them upon the carrier belts 10. These tumblers must be properly oriented prior to actually entering the space between and being supported by pairs of these carrier belts so that they will be suspended between them with the lower margin of the cap skirt S resting upon adjacent edges of the carrier belts and with the body of the tumbler or such container suspended from the cap and positioned between the supporting members 21. To this end an orienting belt 25 is arranged between each pair of carrier belts 10 in proximity to the receiving end R, each such orienting belt being trained over a pair of pulleys 26. The upper reach 27 of each orienting belt moves along an inclined path which slopes downwardly away from the receiving end R toward the center of the apparatus. These orienting belts are driven in the same direction as the carrier belts 10 but at a somewhat higher speed. This driving power is obtained from the motor M heretofore mentioned, operating through a drive belt 28, which is trained over a pulley 29, the latter carried by a horizontal shaft 30 upon which one of said pulleys 26 is mounted.

Closely overlying each of the carrier belts 10 between the front edge of the accumulator table 24 and the innermost pulley 26 is a rigid horizontal finger 31 which may, if preferred, be formed as an integral part of the accumulator table 24. Each of these fingers preferably has a convex upper surface with the result that tumblers or such articles when pushed off of the accumulator table will by reason of the convex surface formation of these fingers quickly assume a recumbent position upon the orienting belts, either capped end or base end foremost, as illustrated in Fig. 1. The rapid forward motion of the oriented belts quickly moves the containers to a position in which they are suspended between the carrier belts as shown in Fig. 4. A rigid inclined guide bar 32 is arranged in a plane medially between and below each pair of carrier belts for the purpose of guiding the containers from an inclined position to an upright position as indicated in Fig. 2. Except for the presence of such a guide bar 32 the tumblers tend to swing in pendulum-like fashion and for this reason often would be inaccurately positioned at the time of their arrival at the delivery end D. Preferably each of these guide bars 32 is a V-shaped channel having its upper end positioned at the level of the adjacent end of the corresponding orienting belt 27 and its lower end positioned just above the shaft 14 which supports the pulleys 13. Rods 33 provide adjustable supporting means for the guide bar 32. Because of the V-shaped cross-sectional contour, there are two transversely spaced points of contact between the bar and containers which further contribute to to stable positioning of the containers.

At the delivery end of the apparatus and at which point the tumblers or such containers are inverted and placed upside down upon the belt 18, we have provided an arcuate guide plate 34 or confining plate which is formed concentric with the pulleys 13 and spaced from the periphery of the latter only sufficiently to provide a channel of the necessary dimensions to accommodate the advancing cap or closure of the container. Thus, each container as it moves through the arc on its way to the receiving conveyor 18 is held with its longitudinal axis extending approximately radially of the corresponding pulleys 13. This guide plate is suitably anchored to the frame 15 and as shown in Fig. 2 includes a sloping discharge end 35 down which the containers slide in succession preparatory to placement upon the conveyor 18.

Reviewing the operation briefly, it is believed to be apparent that it involves accumulating containers in substantial numbers upon the table 24 and manually or otherwise pushing them onto the orienting belts 25 and fingers 31, the latter varying relatively in length, if desired, and the transfer of such containers, after orientation, to the carrier belts 10. Thereupon these containers gradually assume upright positions and quickly travel through an arc of approximately 180° so that they will be deposited upside down upon the conveyor 18. This conveyor, as suggested heretofore, may carry the containers through a zone, or zones, in which they are properly grouped preparatory to automatic packaging at a so-called "casing station," or to any other point desired.

Modifications may be resorted to within the spirit and scope of the appended claims.

We claim:

1. In apparatus of the character described a pair of carrier belts arranged side by side in parallel spaced relationship and including upper and lower reaches extending generally horizontally, pulleys over which said belts are trained, means operable to positively drive certain of the pulleys, rigid supporting members for the upper reaches of the carrier belts, said supporting members extending lengthwise of the upper reaches and being of less width than the supported carrier belts, a table at least in part overlying one end of said upper reaches, substantially horizontal fingers projecting from one margin of said table and closely overlying adjacent portions of the carrier belts, an orienting belt moving at a faster speed than the carrier belts and in the same general direction as the upper reaches of the latter and having an upper reach in a plane below and lying between said carrier belts in proximity to the aforementioned fingers, an arcuate guide plate partially encircling and concentric with those pulleys remote from said table and article receiving means arranged below said belts and one end of the guide plate.

2. The combination defined in claim 1 in which the lower reaches of the carrier belts move along a path inclined upwardly toward the table end of the apparatus and the article receiving means is a continuously moving substantially horizontal belt conveyor.

3. The combination defined in claim 1 together with a bottom guide bar lying in a plane between and at a level below that of the carrier belts and extending substantially from the axis of those pulleys remote from said table approximately to the adjacent end of the orienting belt.

4. The combination defined in claim 1 in which said projecting fingers are formed with transversely convex upper surfaces and are of substantially the same width as the adjacent surfaces of the carrier belts.

5. The combination defined in claim 3 in which the said bottom guide bar is generally V-shaped in cross-section.

6. The combination defined in claim 1 wherein the means for positively driving certain of the pulleys also moves said orienting belt.

7. The combination defined in claim 1, there being at least four carrier belts and at least one of said fingers being shorter than the others.

8. The combination defined in claim 1 in which the rigid supporting members are elements each formed with a longitudinal upwardly faced channel forming a slideway for a carrier belt.

References Cited in the file of this patent

UNITED STATES PATENTS

| | | |
|---|---|---|
| 2,383,528 | Winters | Aug. 28, 1945 |
| 2,471,479 | Coons | May 31, 1949 |